United States Patent [19]
Craig

[11] 3,888,111
[45] June 10, 1975

[54] SEALED BEAM HEADLAMP UNIT LEAK DETECTION SYSTEM

[75] Inventor: Gale M. Craig, Anderson, Ind.

[73] Assignee: General Motors Corporation, Detroit, Mich.

[22] Filed: Nov. 21, 1973

[21] Appl. No.: 417,792

[52] U.S. Cl. .................................. 73/40.7; 73/49.3
[51] Int. Cl. ............................................ G01m 3/00
[58] Field of Search .......... 73/49.3, 40.7, 45.4, 49.2

[56] References Cited
UNITED STATES PATENTS

| | | | |
|---|---|---|---|
| 3,578,758 | 5/1971 | Altshuler | 73/40.7 |
| 3,645,127 | 2/1972 | Mongodin et al. | 73/40.7 |

Primary Examiner—Jerry W. Myracle
Attorney, Agent, or Firm—Peter D. Sachtjen

[57] ABSTRACT

A leak detection system for sealed beam headlamp units having a gas fill including helium wherein a headlamp unit is placed in an evacuated chamber to draw the gas fill through any unit leakage paths to the chamber which is then back-filled with carbon dioxide. A high flow rate probe having a carbon dioxide shield is inserted into the chamber to withdraw a gas sample through a conduit to a mass spectrometer that detects any helium leakage, the carbon dioxide being condensed in a cold trap prior to the mass spectrometer thereby presenting only the leaked gas fill for detection.

3 Claims, 1 Drawing Figure

PATENTED JUN 10 1975 3,889,111
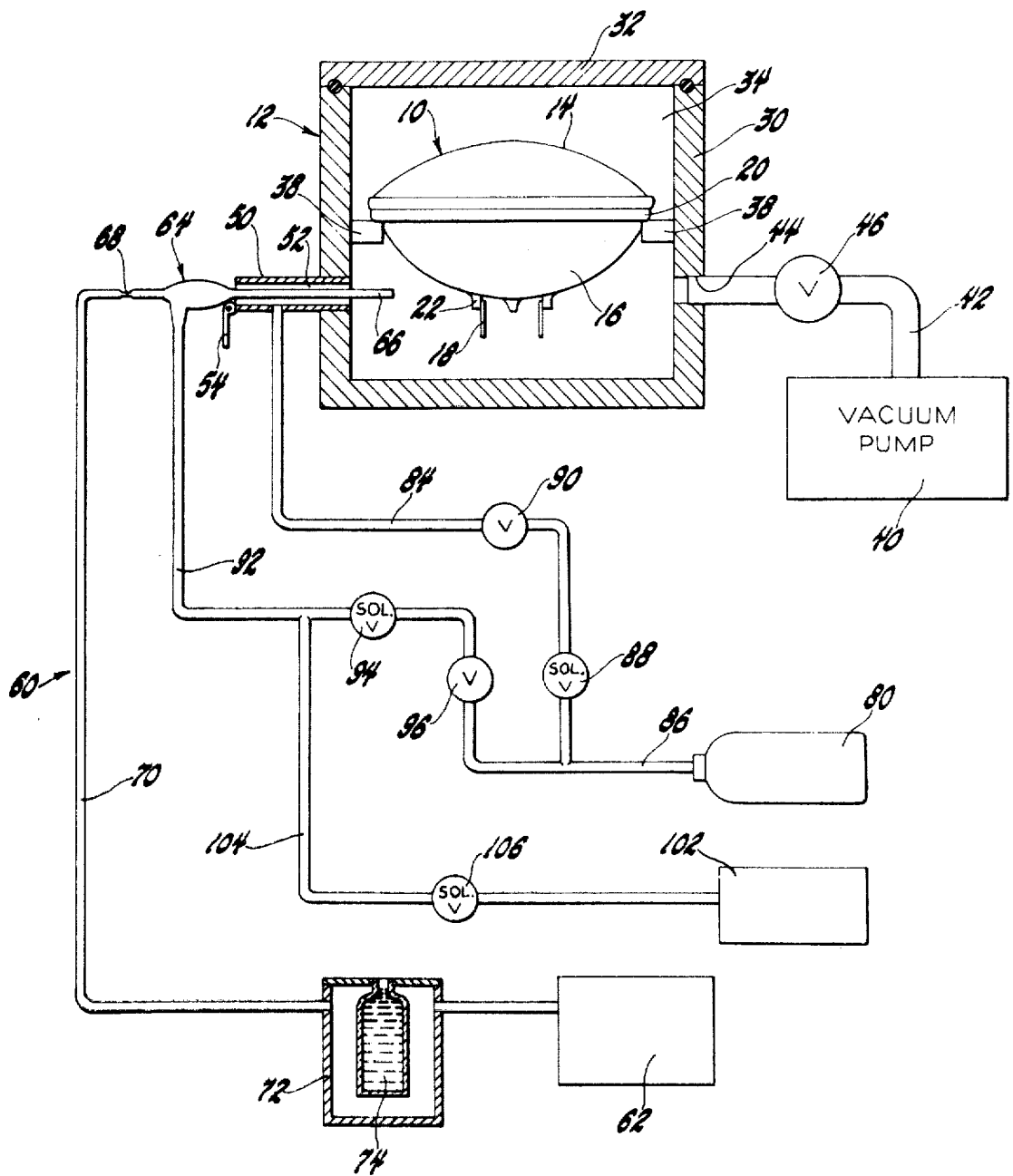

SEALED BEAM HEADLAMP UNIT LEAK DETECTION SYSTEM

The present invention relates to lighting units and, in particular, a system and method for detecting leakage in sealed beam headlamp units.

In the manufacture of sealed beam headlamp units of the type used on motor vehicles for forward lighting, a lamp envelope is filled with an inert gas mixture comprising argon and nitrogen. The mixture is retained in the lamp interior cavity at a pressure slightly below atmospheric. When the filament is energized, the pressure of the gas mixture increases, and, by having the pressure initially subatmospheric, the resultant operational pressure is at or slightly above atmospheric thereby reducing pressure differentials at the fusion joints between the lens, reflector, and terminals. Because the envelope pressure is slightly subatmospheric, any leakge paths at the fusion joints can cause an ingestion of water vapor to the lamp interior. This will initiate water cycle erosion which can lead to premature failure of the filament. Accordingly, it is desirable to ascertain those units having leakage problems, first, to determine which units are not acceptable for field use and, second to determine the manufacturing cause, if any, for the leakage.

Presently, sealed beam unit leakage is determined by placing the completed units on a holding conveyor for an extended period of time, generally in excess of 8 hours. The units are then transferred on a light up conveyor which engages the terminals with a source of electrical power to energize the filaments. If leakage has occurred, moisture is drawn inwardly as previously mentioned. Upon illumination, if a filament expels visible vapor, it is assumed that the unit has leaked and is accordingly rejected. As will be appreciated, this system involves considerable use of storage space for the various conveyors. It is also disadvantageous inasmuch as the extended time between manufacture and checking necessarily delays identifying and rectifying a potential manufacturing cause of leakage. It also relies on a subjective visual appraisal as to the cause of the filament discharge.

The present invention overcomes the above limitations of prior leakage testing methods by providing a system wherein each unit may be quickly and objectively checked for leakage. These features are achieved by modifying the normal fill gas mixture to include a small percentage of a tracer gas such as helium. The unit is then placed in a sealed chamber which is evacuated to remove atmospheric air. During the evacuation of the chamber, fill gas escapes from through any leakage paths. The chamber is thereafter back-filled with a low temperature condensable gas such as carbon dioxide. Any leaking fill gas then admixes with the carbon dioxide to form a contaminated mixture. A probe connected to a mass spectrometer is then inserted into the cavity and is operative to draw a sample of the contaminated mixture to the mass spectrometer which detects the presence of any leaking helium. The carbon dioxide in the sample is condensed at a cold trap prior to the mass spectrometer.

A high production rate is achieved in this system by using a shield of carbon dioxide at the probe tip. This prevents ingestion of atmospheric air. As atmospheric gases are also detected, but to a lesser extent than helium, their exclusion increases the reliability of detection. Also it allows a higher, and thus more readily detected, inlet rate to the probe. A further source of detection error is eliminated by using a carbon dioxide as a gas shield at the probe tip as well as the carrier gas. This insures that all extraneous gases other than those directly leaking from the lamp interior are condensed at the cold trap. Accordingly, only the contaminated sample, which is but a small percentage of the total ingested sample, is presented to the mass spectrometer for detection. By shielding the probe at all times except for when a sample is being ingested into the probe, the probe and mass spectrometer are immediately readied for the next unit after testing. This permits the system to be used with a series of chambers or on an indexing machine and accordingly provides for individual, objective, high rate testing of sealed beam units for potential lamp failure due to leakage. Inasmuch as this can be performed immediately after sealing of the lamp envelope, the need for holding conveyors and light up conveyors is eliminated. Also, any manufacturing defect can be immediately noted, its cause ascertained and the appropriate remedy provided.

These and other features of the present invention will be apparent to those skilled in the art upon reading the following detailed description, reference being made to the accompanying drawings illustrating a preferred embodiment in which the single FIGURE is a schematic diagram of a leak detection system for a sealed beam headlamp unit made in accordance with the present invention.

Referring to the drawing, a sealed beam headlamp unit 10 is placed in a lamp chamber 12. The sealed beam unit 10 is a conventional integral and indivisible optical assembly comprising a lens 14, a reflector 16 and terminals 18. The unit together with one or more other units function as a major lighting device to provide general illumination ahead of a motor vehicle.

The lens 14 and reflector 16 are fusion sealed together at a peripheral annular rim 20. The terminals 18 are secured to metal ferrules 22 embedded in the rear surface of the reflector 16. Incomplete fusion in the joints between the lens 14 and the reflector 16, and the ferrules 22 and the reflector 16, can create potential leakage paths between the lamp interior and atmosphere. Any such leakge paths permit water vapor to be drawn into the lamp interior. This can initiate a water cycle erosion which can cause premature filament failure.

Whereas conventional sealed beam headlamp units are filled with a gas mixture consisting of argon and nitrogen at a pressure slightly below atmospheric, a lamp unit 10 made in accordance with the present invention additionally includes a small percentage of a tracer gas such as helium. The percentage of the helium is a readily detectable amount substantially 1 percent or greater. When the lamp filament is deenergized, the fill gas mixture is at a pressure slightly below atmospheric. When the filament is energized, the resultant heating of the contained gas increases the pressure to slightly above atmospheric.

The lamp chamber 12 comprises a cylindrical housing 30 and a circular self-sealing lid 32 thereon. The interior wall of the housing 30 and the lid 32 define a cavity 34. The unit 10 is supported interior of the cavity 34 on a plurality of lugs 38 attached to the inner surface of the housing 30. A vacuum pump 40 is connected by a conduit 42 with the cavity 34 through an opening 44 in the sidewall of the housing 30. An on-off valve 46 is interposed in the conduit 42 between the vacuum pump 40 and the cavity 34. The valve 46 is operative to connect the vacuum pump 40 to the cavity 34 to thereby evacuate the latter to a low vacuum. A cylindrical probe pipe 50 is received in an opening in the sidewall of the housing 30 opposite the conduit 42. The probe pipe 50 defines a cylindrical probe port 52 communicating with the cavity 34. A flap valve plate 54 is hingedly connected at the outer lower edge of the probe pipe 50. The valve plate 54 is movable between the illustrated open position and a closed position sealing the end of the pipe 50.

The system also incorporates a leak detection analyzer comprising a probe unit 60 and a mass spectrometer 62. The mass spectrometer 62 is a conventional unit which is operative to detect the presence of a tracer gas such as helium when a gas sample is presented thereto. The probe unit 60 includes a sniffer probe 64 having a tip 66 inserted through the probe port 52 into the cavity 34. The probe 64 has an axial passage terminating with a restriction disc 68, illustrated schematically. The disc 68 has an orifice which restricts the flow rate through a flexible conduit 70 connected between the probe 64 and the mass spectrometer 62.

The flexible conduit 70 is connected to a vacuum system, not shown, at the mass spectrometer to establish a flow path from the probe thereto. The terminal portion of the conduit 70 passes through a cold trap 72 containing liquid nitrogen 74 or other suitable super cooled medium. The cold trap 72 is operative to condense undesirable gases which if transmitted directly to the mass spectrometer could cause instrument damage. Generally the cold trap removes condensable gases such as oxygen, water vapor and, insofar as the present invention is concerned, carbon dioxide from the ingested gas sample. The cold trap 72 is merely indicated schematically in the present invention and a wide variety of other similar devices could likewise be incorporated in the line or within the mass spectrometer 62 per se.

A source of carbon dioxide 80 is connected in parallel with conduits leading to the probe pipe 50 and the probe 64. More particularly, a conduit 84 is connected to the source 80 via a main line 86. The flow through conduit 84 is controlled by a solenoid valve 88 and a rate adjustable valve 90. The source 80 and the main line 86 are also connected to a flexible line 92. The flow through flexible line 92 is controlled by a solenoid valve 94 and a rate adjustable valve 96. The line 92 is connected to the probe 64 immediately upstream of the restriction disc 68. The valves 94 and 96 are operative to control the flow of carbon dioxide from the source 80 to the probe 64 for transmission through the interior passage thereof. This provides a gas shield surrounding the tip 66 that prevents the ingestion of extraneous atmospheric gases to the line 70 and transmission to the mass spectrometer 62.

A vacuum pump 102, which may or may not be common to vacuum pump 40, is fluidly connected at line 92 downstream of the valve 94 by a branch line 104. The flow through the line 104 is controlled by a solenoid valve 106. When the valve 106 is open the vacuum pump evacuates the lines 104, 92 and the internal passage of the probe 64. This causes an ingestion of a gas sample to immediately adjacent the restriction disc 68. The gas sample will thus be drawn by the mass spectrometer vacuum system through line 70 to the mass spectrometer 62 for detection of any tracer gas.

OPERATION OF THE LEAK DETECTION SYSTEM

The subject leak detection system incorporates the procedure hereinafter described. A sealed beam unit 10 to be tested is placed in the cavity 34 with the rim 20 resting on the lugs 38. The self-sealing lid 32 is thereafter placed on the top rim of the housing 30. The flat valve plate 54 is closed to seal the probe port 52. Valve 46 is then opened to connect the cavity 34 to vacuum pump 40 for evacuation. During this time, the fill gas escapes through any leakage paths. After evacuating the cavity 34, the valve 46 is closed and the solenoid valve 88 is opened, the valve 90 having been set at a predetermined value to provide the desired flow rate of carbon dioxide from the source 80. The carbon dioxide thus flows through line 84 to the probe pipe 50 for purging and back-filling of the cavity 34. When the pressure in the cavity 34 exceeds atmospheric, the flap valve plate 54 falls open and excess carbon dioxide vents to atmosphere through the probe port 52. This excess flow is maintained through line 84 from the source 80 until the leakage check hereafter described has been completed. With this system therefore, atmospheric gases and resultant contamination are excluded from the cavity 34.

Meanwhile the valve 94 is opened to shield the probe tip 64. By regulation of valve 96, a predetermined purging flow of carbon dioxide is routed from the source 80 through flexible line 92 to the probe 64. This establishes a shielding flow outwardly through the tip 66 to prevent atmospheric contamination at the restriction disc 68. After the valve plate 54 is opened, the probe tip 66 is inserted through the port 52 into the cavity 34.

When the probe has been positioned at the illustrated "sniffing position", valve 94 is momentarily closed for about 1 second to stop the shielding flow through the probe 64. During this time, valve 106 is momentarily opened thereby evacuating gases from the lines 104 and 92 and drawing a gas sample from the cavity 34 into the probe interior adjacent the restriction disc 68. The gas sample comprising the carrier gas, carbon dioxide and any escaped or leaked fill gas including the tracer gas, helium, is then drawn through the line 70. The carbon dioxide is condensed from the gas sample at the cold trap 72. The remaining gases, if any, pass to the mass spectrometer 62. In the event leakage has occurred, helium, argon, and nitrogen from the lamp interior will be drawn outwardly into the cavity during evacuation and will thereafter be admixed with the carrier gas, carbon dioxide. Thus as the carrier gas is condensed, only the helium, argon and nitrogen will be presented to the mass spectrometer.

When a conventional mass spectrometer is operated ib the presence of atmospheric air, the flow rate thereto must be kept extremely low inasmuch as the unit is also sensitive to other gases. Such gases if ingested in large amounts can cause serious damage to the device. By providing the shielding gas flow, a high inlet rate can be maintained to the detector inasmuch as the extraneous gases are condensable and hence the removed medium from the gas sample. The ability to ingest a large sample with the resultant high rate to the mass spectrometer provides a readily detectable gas sample and the extremely high production rate. This enables lamp leakage to be quickly, objectively, and reliably detected.

After the contaminated gas sample has been presented to the mass spectrometer 62, the valve 106 is closed and the valve 94 is reopened. This reestablishes the shielding flow through the probe 64. The valve 88 is closed to interrupt the carrier gas flow to the cavity 34. The lid 32 is opened and the tested unit 10 removed therefrom. The above procedure is then repeated with successive units. By maintaining the probe shielding flow, the mass spectrometer is immediately readied for subsequent examination of the next unit. In a production application, it is contemplated that multiple chambers on an indexing machine would be utilized. With the above-described operation being carried out at individual stations, a single or multiple probe could be used for leak detection purposes.

Although only one form of this invention has been shown and described, other forms will be apparent to those skilled in the art. Therefore it is not intended to limit the scope of this invention by the embodiment selected for the purpose of this disclosure, but only by the claims which follow.

What is claimed is:

1. A method of detecting leakage in a lamp unit having a gas fill including helium, comprising the steps of: placing the lamp unit in a sealed chamber; evacuating the chamber to draw said gas fill through any leakage paths in the unit; filling the chamber with carbon dioxide to atmospheric pressure; inserting a probe into said chamber while maintaining said filling with carbon dioxide; shielding the probe with carbon dioxide to prevent atmospheric contamination thereof; connecting said probe to a device for detecting the presence of helium; drawing the contents of the chamber to draw thereinto; condensing the carbon dioxide of said contents prior to said device; conveying said contents including any leaked gas fill less said carbon dioxide to said device such that only the leaked gas fill is presented to the device for detection of the leaked helium.

2. A leak detection system for a lamp unit having a gas fill including helium, comprising: a housing having a sealed chamber adapted to receive said lamp unit therein; a vacuum pump fluidly connected to the chamber for evacuating the chamber when a lamp unit is received therein to thereby draw gas fill through any leakage paths in the lamp unit; a probe port in said housing; first valve means cooperating with the port and movable between a closed position and an open position when said chamber is at atmospheric pressure; a source of carbon dioxide; first conduit means fluidly connecting said source of carbon dioxide with said chamber; second valve means operative after the chamber is evacuated for directing the flow of carbon dioxide through said first conduit means to said chamber to fill the latter to atmospheric pressure and mix with any leakage gas fill to form a gas sample, said first valve means moving to the open position when the chamber reaches atmospheric pressure to open said probe port; a probe having a tip insertable through said open probe port into said chamber; a mass spectrometer for detecting the presence of helium in a gas sample, second conduit means fluidly connecting said probe with said mass spectrometer for delivering a gas sample thereto; a cold trap surrounding a portion of said second conduit means operative to condense any carbon dioxide flowing therethrough; means for connecting said probe to said source of carbon dioxide to maintain a shield flow of carbon dioxide through said probe tip when said first valve means is in its open position; vacuum means connected with said probe operative to draw gas samples from said chamber into said probe for transmission through said second conduit means to said mass spectrometer for detection of any helium that has leaked from said unit.

3. A method of detecting leakage in a lamp unit having a gas fill including a tracer gas, comprising the steps of: placing the lamp in a sealed chamber; evacuating the chamber to draw the gas fill from the unit into the chamber through any leakage paths in the unit; introducing a condensable carrier gas into the chamber for admixing with the escaped gas fill; transferring the carrier gas and any escaped gas fill to a device for detecting the presence of the tracer gas; and condensing the condensable carrier gas prior to said device to thereby present only said escaped gas fill including the tracer gas for detection.

* * * * *